United States Patent [19]

Michel et al.

[11] 4,061,594

[45] Dec. 6, 1977

[54] ALUMINA-BASED BODIES OBTAINED BY AGGLOMERATION WHICH ARE RESISTANT TO ELEVATED TEMPERATURES

[75] Inventors: Max Michel, Yerres; Regis Poisson, La Rochelle, both of France

[73] Assignee: Rhone-Poulenc Industries, Paris, France

[21] Appl. No.: 750,222

[22] Filed: Dec. 13, 1976

Related U.S. Application Data

[63] Continuation of Ser. No. 539,847, Jan. 9, 1975, abandoned.

[30] Foreign Application Priority Data

Jan. 10, 1974 France ............................... 74.00803
Nov. 18, 1974 France ............................... 74.37892

[51] Int. Cl.$^2$ .......................... B01J 23/10; B01J 23/08

[52] U.S. Cl. ..................................... 252/462; 252/463
[58] Field of Search ................................ 252/462, 463

[56] References Cited

U.S. PATENT DOCUMENTS

| | | | |
|---|---|---|---|
| 3,453,331 | 7/1969 | Hargis et al. | 252/462 X |
| 3,483,138 | 12/1969 | Stephens | 252/462 |
| 3,551,354 | 12/1970 | Schutten | 252/463 X |
| 3,839,230 | 10/1974 | Cobzaru | 252/463 |
| 3,850,849 | 11/1974 | Kiovsky et al. | 252/463 |
| 3,867,312 | 2/1975 | Stephens | 252/462 |

*Primary Examiner*—Carl F. Dees

[57] ABSTRACT

Alumina based bodies having resistance to temperatures of up to 1200° C prepared by autoclaving alumina and at least one additive from the group of oxides of lanthanum, neodymium, praseodymium and thorium. Bodies of the alumina of this invention are useful in adsorption and catalysis.

14 Claims, No Drawings

ALUMINA-BASED BODIES OBTAINED BY AGGLOMERATION WHICH ARE RESISTANT TO ELEVATED TEMPERATURES

This is a continuation, of application Serial No. 539,847, filed Jan. 9, 1975 now abandoned.

The invention relates to alumina-based substances obtained by agglomeration of active alumina, whose resistance at high temperatures is increased by the addition of metallic oxides.

It is well known that the agglomeration of particles of active alumina gives substances which find very diverse applications, and that greatly varied characteristics of specific surface and porosity can be imparted to these substances according to the desired applications or uses, which are particularly important in adsorption and catalysis.

However, these characteristics are not the only ones to be considered since these substances, in order to be capable of industrial use, must possess good properties of mechanical resistance, both to crushing and to attrition. Moreover, it is very frequent that in the course of their use or in the course of regeneration operations, such substances obtained by agglomeration are subjected to temperatures which are sufficiently high to cause a change or alteration in their texture and structure. That modifies not only their adsorbent or catalytic properties but likewise their mechanical properties; these latter properties, being a function of the temperature, in fact, generally pass through a minimum associated with the progressive loss of water molecules entering contained in the various active aluminas, the cohesion of the different alumina particles then increasing by supplementary raising of the temperature which involves fritting of these particles which are then in the state of α alumina or corundum.

Numerous experiments have been carried out in order to obtain alumina-based materials which retain great mechanical resistance at quite high temperatures, and are nevertheless endowed with the desired characteristics of specific surface and porosity. With this aim, for example, it has been proposed to autoclave substances obtained by agglomeration of active alumina particles, the effect being particularly marked when this treatment takes place in the presence of various acids. These processes lead to satisfactory results, and the substances thus obtained are particularly well suited for use in certain catalytic applications such as the purification of the gases emitted by internal combustion engines, where temperatures between 1000° and 1100° C, or even 1200° C, are reached. The specific surface of these substances are moderate but their porosity should be quite high. Such processes are described in French Patents Nos. 1,386,364 and 1,449,904.

Another way to avoid the progressive transformation of active aluminas by loss of water at high temperatures comprises adding various oxides thereto which act as stabilizers. With this aim, the most frequently recommended oxides are those of the alkaline and alkaline earth metals, oxides of the metals of Group III A of the periodic table, oxides of thorium and oxides of silicon. However, the instructions given in the past are frequently of too general a nature to permit preparation, with certainty, of sufficiently interesting results for industrial exploitation, and, furthermore, certain recommended additives can interfere harmfully with the specific catalytic elements added to the aluminous substances serving as supports. Thus, for example, recommended stabilizers such as silica, magnesia and the oxides of the rare earth metals are each specific to this or that active alumina, the various oxides of the rare earth metals do not have identical actions and the oxides of the alkali metals, likewise recommended as stabilizers, cannot be introduced into the supports of certain catalysts since they act then as catalytic poisons, which is frequently the case with the above-mentioned silica.

It has been sought to improve the alumina substances, intended for use as catalyst supports, obtained by agglomeration of active alumina particles (in particular, those prepared from the partial dehydration of hydrargillite and alumina gels in hot gas currents) and have found that such substances when autoclaved, and in particular autoclaved in the presence of acids, are stabilized in a very effective manner up to a temperature reaching 1200° C by the oxides of certain of the rare earth metals which are those of lanthanum, neodymium and praseodymium, and by oxides of thorium. Moreover, it is preferable to avoid, as far as possible, the presence of compounds of the alkali metals and especially that of sodium which frequently has a harmful effect upon the catalytic properties, as indicated above. Such substances occasionally posses not only a specific surface which decreases relatively less rapidly with temperature, but also a greater solidity for a greater porous volume. In industrial practice, while the substances obtained from hydrargillite already posses a very interesting set of characteristics, it is sometimes necessary to obtain substances which are lighter and yet are sufficiently resistant. Alumina gels facilitate the preparation of such substances which can further display higher specific surfaces at high temperature than those obtained from hydrargillite. It should be noted, however, that as a result of the great porous volume of the alumina-based substances obtained from gels, one cannot obtain such high crushing resistances as those of the more dense substances obtained from active aluminas prepared from the dehydration of hydrargillite; the attrition resistances obtained are, however, high and unexpectedly exhibit values at least equal to those obtained for substances derived from hydrargillite. That is of great interest for all applications where vibrations of the apparatuses are inevitable.

The proportions to be utilized of the oxides under consideration are between 1% and 15% by weight of the quantity of alumina of these substances, and, more particularly, between 2% and 7%; it should be noted that these proportions are quite clearly lower than those frequently utilized in certain catalysts where oxides of the rare earth metals play a catalytic part, particularly at temperatures at which the stabilizing effect does not have to intervene.

The alumina based substances according to the invention can be obtained in different ways. For example, one can add the oxides or the oxide precursors of the metals enumerated above by mixture or impregnation of alumina hydrates before their activation by dehydration, their agglomeration and the autoclaving of the substances obtained; it is likewise possible to add these same oxides or their precursors to active alumina powders obtained by dehydration of alumina hydrates, and then to effect the agglomeration of these powders, and then employ the autoclave treatment of the substances obtained. It is also possible to add the precursors of these oxides by impregnation to the substances obtained by agglomeration of active alumina powder, and then to treat these substances in the autoclave. Finally, and in preferred manner, it is possible to add the precursors of the oxides under consideration by impregnation after the treatment of the alumina substances in the autoclave, and more preferably, after a reactivation following autoclave treatment; however, in the case where the alumina substances are derived from gels, it is further possible to operate by coprecipitation of solutions containing aluminum salts and salts of the rare earth metals at the same time, as precursors of the alumina and of the various added oxides; this latter process provides very great homogeneity of the finished products.

According to the selected manner of addition of the considered oxides to the alumina substances, one can be led to additional drying and calcination operations; these procedures are well known and need not be described in detail.

In any case, the alumina-based substances thus obtained are then dried and calcined at the selected temperature which can reach approximately 1200° C, as indicated previously. To illustrate the present invention, various examples are given below concerning substances obtained from hydrargillite and from alumina gel, along with comparative examples showing that the unautoclaved substances are not improved by the oxides which are effective on the autoclaved substances, and that the oxides of certain other rare earth metals have little action.

For the examples in which the substances are obtained from hydrargillite, as initial product one utilizes alumina balls of diameters of between 2.5 and 4 mm, obtained by agglomeration in a rotating granulator of hydrargillite prepared in accordance with the Bayer process after partial dehydration in a current of hot gases; these balls are washed to reduce their $Na_2O$ content to less than 0.2%, then calcined at 600° C for the purpose of activation. These balls have a specific surface of 250 sq.m./g., a grain density of 1.22, a grain-by-grain crushing resistance of 10 kg (average), and an attrition resistance measured by the microgrinder of 97.5%; hereinafter these balls are called support A. A portion of these balls is subjected to an autoclave treatment in the presence of acetic acid, then reactivated at 600° C. The support thus obtained, called support B, has a specific surface of 90 sq.m./g., a grain density of 1.20, a grain-by-grain crushing resistance of 11 kg and an attrition resistance of 99.7%. These supports A and B and the different products obtained from these supports by various additions of oxides are then calcined at 1200° C for four hours; the same characteristics as those indicated for the supports A and B are measured on all these samples.

For the examples concerning the substances obtained from alumina gels, the initial product called support M is in the form of balls of diameter between 2.5 and 4 mm obtained by agglomeration in a rotating granulator of an alumina powder obtained by partial dehydration in a hot gas current of a washed and dried alumina gel obtained by precipitation of sodium aluminate with nitric acid at a pH between 9 and 10. This washed and dried gel, examined by X-rays, proves to be a mixture of monohydroxides of the pseudoboehmite type and trihydroxides of the bayerite and hydrargillite type. After agglomeration, the balls are ripened in water vapor atmospheres, then dried and calcined at 500° C. After calcination at 600° C for four hours, support M has a grain density of 0.76, a specific surface of 210 sq.m./g., a crushing resistance of 7.4 kg and an attrition resistance of 99.9%. This support and the different products obtained by adding oxides of praseodymium and didymium thereto are calcined at 1000° and 1200° C for 4 hours. The same characteristics as those indicated previously are measured on these various samples.

EXAMPLE 1

Different fractions of the support B are impregnated with solutions of the nitrates of lanthanum, neodymium, praseodymium and thorium in concentrations such that after calcination, the supports contain 4% of the various oxides in relation to the alumina.

EXAMPLE 2

This example is a comparative example and concerns substances obtained from the supports B to which, in a manner analogous to that described in Example 1, in relation to the alumina there are added 4% by weight of the oxides of samarium, gadolinium and yttrium, which exhibit little effect.

EXAMPLE 3

This example concerns substances containing different proportions of the oxides of lanthanum and neodymium; these substances are obtained from supports B in the manner indicated in Example 1.

EXAMPLE 4

This example concerns substances containing additions of 4% by weight in relation to the alumina of the oxides of lanthanum and neodymium; they are obtained by the calcination of supports B impregnated by solutions of metal chlorides.

EXAMPLE 5

This comparative example concerns substances obtained from the supports A to which there are added 4% by weight, in relation to the alumina, of neodymium oxide by impregnation with the corresponding nitrate.

The various results are combined in the following Table I in which there likewise appear the results relating to supports A and B calcined at 1200° C, serving as control.

TABLE I

| Supports or Examples | by weight of oxides in relation to alumina | Metal of the oxide | Grain density | Specific surface sq.m./g. | Mean resistance to crushing kg | Attrition resistance % |
|---|---|---|---|---|---|---|
| Support A calcined 1200° C | 0 | — | 1.45 | 10 | 3 | 70 |
| Support B calcined 1400° C | 0 | — | 1.4 | 6 | 10 | 97 |
| 1 | 4 | La | 1.25 | 30 | 15 | 99.3 |
|   | 4 | Nd | 1.25 | 27 | 14 | 99.3 |
| Support B | 4 | Pr | 1.25 | 28 | 14 | 99 |
|   | 4 | Th (ex nitrates) | 1.25 | 28 | 15 | 99 |
| 2 | 4 | Sm | — | 18 | 11 | 97 |
|   | 4 | Gd | — | 15 | 10 | 97 |
| Support B | 4 | Y (ex nitrates) | — | 13 | 11 | 97 |
| 3 | 2 | La | 1.25 | 24 | 13 | 98.2 |
|   | 10 | La | 1.25 | 17 | 15 | 99.2 |
| Support B | 2 | Nd | 1.25 | 15 | 14 | 98.3 |
|   | 10 | Nd (ex nitrates) | 1.25 | 22 | 13 | 99 |
| 4 | 4 | La | 1.25 | 28 | 14 | 99 |

TABLE I-continued

| Supports or Examples | by weight of oxides in relation to alumina | Metal of the oxide | Grain density | Specific surface sq.m./g. | Mean resistance to crushing kg | Attrition resistance % |
|---|---|---|---|---|---|---|
| Support B | 4 | Nd (ex chlorides) | 1.25 | 21 | 14 | 99 |
| 5 Support A | 4 | Nd (ex nitrate) | 1.45 | 14 | 5 | 75 |

This Table permits various comparisons: Firstly, the particular effect of certain oxides is clearly shown by comparison of Examples 1 and 2 since the oxides of samarium, gadolinium and yttrium have practically no effect upon the mechanical resistance although they permit a certain stabilization of the specific surface, whereas the oxides of lanthanum, neodymium, praseodymium and thorium act simultaneously upon the values of the mechanical resistance and specific surface. Putting the results of Example 3 together with the results concerning lanthanum and neodymium from Example 1 shows that the quantity of added oxides can be quite small since the addition of 2% of lanthanum or neodymium has a very great stabilization effect, and that this added quantity diminishes the value of the specific surface beyond a certain value. Comparison of Examples 1 and 5 shows the necessity of effecting autoclaving since neodymium, the efficacity of which is demonstrated, added to support A, somewhat slightly stabilizes the specific surface but only very insufficiently increases the mechanical resistance. Finally, Example 4 shows that the origin of the oxides is immaterial. In general, it should be noted that the grain density is stabilized at a value clearly below that of the supports without addition of oxides, which thus corresponds to a greater porosity which is often necessary in catalyst supports.

EXAMPLE 6

This example is given by way of comparison; support M is impregnated with a solution of didymium nitrate which is a mixture of the nitrates of praseodymium and neodymium, the quantity of this solution being such that it exactly fills the porous volume of the support and its concentration being such that after drying and calcination the oxides of praseodymium and neodymium represent 4% of the weight of the alumina.

EXAMPLE 7

This same support M impregnated with 5% of its weight of acetic acid is autoclaved for 6 hours at a pressure of 12 bars absolute at about 185° C in an atmosphere of water vapor, then calcined at 500° C for the purpose of reactivation; it is then impregnated as indicated in Example 6, dried and calcined.

EXAMPLE 8

Support M is impregnated by an acetic solution of didymium acetate of such concentration and in such quantity that the introduced quantity of acetic anions is 10% by weight of the anhydrous support and that the quantity of didymium acetate corresponds, expressed as the oxide, to 4% of the weight of this support. The support thus impregnated is autoclaved as indicated in Example 7, then dried and calcined.

The following Table II brings together the results obtained and those concerning the calcined support M serving as control; moreover, in this table there are shown the results concerning support B of Table I with 4% of neodymium oxide mentioned in Example 4, the calcinations being effected at 1000° and 1200° C.

TABLE II

| Examples | Grain density after calcination at | | Specific surface sq.m. g. after calcination at | | Mean crushing resistance in kg after calcination at | | Attrition resistance in % after calcination at | |
|---|---|---|---|---|---|---|---|---|
|  | 1000° C | 1200° C | 1000° C | 1200° C | 1000° C | 1200° C | 1000° C | 1200° C |
| Support M calcined at 1000° C and 1200° C | 0.56 | 1.11 | 70 | 6 | 3.1 | 0.5 | 99.7 | 86 |
| 6 | 0.88 | 1 | 105 | 25 | 5 | 4.7 | 99 | 98.0 |
| 7 | 0.79 | 0.85 | 75 | 30 | 4 | 3.5 | 99.9 | 99.7 |
| 8 | 0.79 | 0.86 | 80 | 32 | 4.5 | 4 | 99.9 | 99.8 |
| Support B with 4% by weight of neodymium oxide | 1.20 | 1.25 | 50 | 21 | 14 | 14 | 99 | 99 |

The results of this table show clearly that the improvement effected by the presence of the oxides of praseodymium and neodymium (Example 6) in comparison with the results obtained for the control is increased by autoclaving (Examples 7 and 8); these results are to be compared with the characteristics given previously of the support M calcined at 600° C, particularly as regards the slight increase of the grain density of the substances of Examples 7 and 8 which are in accordance with the invention. Finally, the comparison of the results given by the products deriving from an alumina gel with those given by the product deriving from hydrargillite shows that the products deriving from gels are clearly lighter and have a higher specific surface.

We claim:

1. Alumina-based substances stabilized to a calcination temperature of approximately 1200° C, prepared by autoclaving alumina and 1 to 15% by weight of at least one additive selected from the group consisting of the oxides of lanthanum, neodymium, praseodymium and thorium, and calcining the resulting blend, with said alumina having been produced by partial dehydration of hydrargillite or an alumina gel to produce activated alumina and then autoclaving the activated alumina to form said alumina.

2. Substances according to claim 1 wherein the autoclaving of said activated alumina is effected in the presence of acid.

3. Substances according to claim 1 wherein the proportion of oxides is between 2 and 7% by weight of the alumina.

4. Substances according to claim 1 wherein the alumina is derived from hydrargillite.

5. Substances according to claim 1 wherein the alumina is derived from alumina gels.

6. Substances according to claim 1 wherein the alumina is derived from hydrargillite or alumina gels partially dehydrated in hot gas currents.

7. Substances according to claim 6 wherein the precursors of the oxides or oxide are added to the partially dehydrated alumina and the blend of said precursors and the partially dehydrated alumina are agglomerated.

8. Substances according to claim 1 wherein the said alumina is impregnated by solutions of oxide precursor compounds, and then calcined.

9. Substances according to claim 8 wherein the said alumina is further activated before impregnation.

10. Substances according to claim 1 wherein the alumina is impregnated by solutions of oxide precursor compounds before autoclave treatment.

11. Substances according to claim 1 wherein oxides or oxide precursors are added to the alumina hydrates before their transformation into active alumina and the agglomeration of active alumina is effected in the form of substances which are then autoclave treated.

12. Substances according to claim 5 wherein the substances are obtained by coprecipitation from aluminum salts and salts of lanthanum, neodymium, praseodymium and thorium.

13. Substances according to claim 1 wherein they are substantially free of alkali metal compounds.

14. Alumina-based substances stabilized to calcination temperatures up to 1200° C prepared by combining (1) alumina produced by partial dehydration of hydrargillite or an alumina gel followed by autoclaving to produce the alumina, and (2) from 1 to 15% by weight of at least one additive selected from the group consisting of the oxides of lanthanum, neodymium, praseodymium and thorium, autoclaving the combination of alumina and additive and calcining the combination at a temperature up to 1200° C.

* * * * *

UNITED STATES PATENT OFFICE
CERTIFICATE OF CORRECTION

Patent No. 4,061,594　　　　　　　Dated December 6, 1977

Inventor(s) Max Michel and Regis Poisson

It is certified that error appears in the above-identified patent and that said Letters Patent are hereby corrected as shown below:

In column 4, Table 1, line 55, delete "1400°C" and insert therefor -- 1200°C --.

In column 6, Table II, under the column entitled "Grain density after calcination at 1000°C", delete "0.56" and insert therefor --0.86 --.

Signed and Sealed this

Eleventh Day of April 1978

[SEAL]

Attest:

RUTH C. MASON　　　　　　　LUTRELLE F. PARKER
Attesting Officer　　　　Acting Commissioner of Patents and Trademarks